US006272152B1

United States Patent
Levin et al.

(10) Patent No.: US 6,272,152 B1
(45) Date of Patent: Aug. 7, 2001

(54) USE OF TWO-WAY CABLE TRANSMISSIONS TO AUGMENT THE SECURITY OF THE SECURE ELECTRONIC TRANSACTION PROTOCOL

(75) Inventors: Stuart Z. Levin, Santa Monica; Leo I. Bluestein, San Diego, both of CA (US)

(73) Assignee: TVN Entertainment Corporation, Burbank, CA (US)

( * ) Notice: Subject to any disclaimer, the term of this patent is extended or adjusted under 35 U.S.C. 154(b) by 0 days.

(21) Appl. No.: 09/288,835

(22) Filed: Apr. 8, 1999

(51) Int. Cl.[7] ..................................................... H04J 1/00
(52) U.S. Cl. ............................................. 370/490; 380/232
(58) Field of Search .................................... 370/252, 489, 370/490; 380/23, 49, 232, 239, 241; 713/182, 183, 184; 705/64, 67, 39; 725/5, 6, 111

(56) References Cited

U.S. PATENT DOCUMENTS

| 3,654,604 | * | 4/1972 | Crafton ................................ 713/168 |
| 4,852,154 | | 7/1989 | Lewis et al. . |
| 5,546,379 | * | 8/1996 | Thaweethai et al. ................ 370/252 |
| 5,608,778 | | 3/1997 | Partridge, III . |
| 5,919,257 | * | 7/1999 | Trostle ................................. 713/200 |
| 6,052,785 | * | 4/2000 | Lin et al. ............................. 713/201 |

OTHER PUBLICATIONS

Frank J. Derfler, Jr. and Les Freed; Mixing Computers and Telephones; How Networks Work, 4th Edition; 1998; pp. 66–67; Macmillan Computer Publishing.

Tom Sheldon; Cable (CATV) Data Networks and Modems; Encyclopedia of Networking, Electronic Edition; 1998; pp. 119–122; Osborne/McGraw–Hill.

Ford, W., et al., "Secure Electronic Commerce," Prentice Hall, 1997, p. 133.

* cited by examiner

Primary Examiner—Chau Nguyen
Assistant Examiner—D. Trinh
(74) Attorney, Agent, or Firm—Blakely, Sokoloff, Talyor & Zafman

(57) ABSTRACT

A method and a system for authenticating an electronic financial transaction conducted between a user owning a terminal and a third party via two-way transmissions between the terminal and a cable distribution hub which includes a validation server. The method comprises the following: (a) extracting a first identification attribute of the terminal from a first transmission message sent from the terminal to the cable distribution hub, which corresponds to a first set of user identifiers residing in a database accessible by the validation server; (b) extracting a second identification attribute of the terminal from a second transmission message sent from the terminal to the cable distribution hub, which corresponds to a second set of user identifiers residing in the database accessible by the validation server; (c) comparing the first and second sets of user identifiers to validate the identity of the user; (d) interrupting the electronic financial transaction if there is a discrepancy between the two sets of user identifiers; and (e) allowing the electronic financial transaction to proceed if there is no discrepancy between the two sets of user identifiers.

40 Claims, 6 Drawing Sheets

CONTINUE TO OUTPUT UPSTREAM MESSAGES FOR PROCESSING AS SHOWN IN FIG. 5b

USE OF TWO-WAY CABLE TRANSMISSIONS TO AUGMENT THE SECURITY OF THE SECURE ELECTRONIC TRANSACTION PROTOCOL

BACKGROUND OF THE INVENTION

1. Field of the Invention

The present invention relates generally to methods for enhancing security of electronic transactions, and more particularly, to a method for authenticating electronic financial transactions conducted over two-way transmissions via cable alone or via cable in conjunction with a telephone connection.

2. Description of Related Art

The conventional use of cable is for the delivery of video entertainment to the home subscriber. In response to the need to enhance existing services of cable operators, cable equipment vendors have developed terminals and stand-alone modems which support the transmission of data over cable. The data transmission service is offered in addition to the delivery of video entertainment.

Currently, there are two types of data transmission: the one-way transmission and the two-way transmission. The one-way transmission allows text and graphics to be transmitted and displayed on the home television receiver, possibly simultaneously with video data. In addition to transmission of text, graphics, and video data, the two-way transmission allows bi-directional transmission of Internet Protocol (IP) data between the cable subscriber terminal and the cable distribution hub. For small systems, a third party can assume the function of the cable distribution hub.

While two-way communication is possible over cable, i.e., upstream transmissions to and downstream transmissions from the cable distribution hub, less than half of the existing systems are equipped to support upstream transmissions via cable. In the systems where only downstream transmissions via cable are possible, a telephone modem can be made part of the subscriber terminal to provide the upstream transmission capability.

Two-way communication allows financial transactions to be conducted between a cable subscriber and a merchant.

In order to better support electronic transactions over open networks such as the Internet, Visa and MasterCard have developed the Secure Electronic Transaction (SET) protocol to protect the privacy and security of their customers. This protocol takes over when agreement has been reached between the merchant and the cardholder as to the terms of the sale. For the simplest of transactions, the information flow is as follows.

The cardholder first sends a PInitReq message which contains various identifiers, housekeeping data including digests of all certificates in the cardholder computer. One of these certificates binds the cardholder's identity to his public key. Other certificates validate responses from the merchant. This PInitReq message is optional and contains no encrypted data.

The merchant then sends a PinitRes response which, in addition to the housekeeping data, contains reference to lists of revoked certificates. The cardholder's software uses the lists to reject cancelled merchant certificates in its possession. This PInitRes message which is the response to PInitReq message is also optional and contains no encrypted data.

The cardholder then sends a PReq response which contains encrypted cardholder data, and a digital signature which is not within the encrypted data envelope as well as cryptographic construct that links the ordering information with the payment information. Payment data is "tunneled" through to the acquiring bank without being revealed to the merchant. The digital signature format requires inclusion of the certificates that validate the signature.

The merchant then sends a PRes response which gives the status of transaction and housekeeping data, such as authorization and posting dates, etc., associated with the financial transaction. The PRes message is sent in the clear, i.e., with no encryption, but is authenticated with the merchant's digital signature.

Cardholder certificates are used when making an electronic purchase to insure that cardholder information has not been improperly appropriated and used to fraudulently obtain goods and services. SET uses digital signatures and cardholder certificates to ensure the authentication of the cardholder account.

The credit card does not have to be part of the transaction process if the card number or its cryptographic surrogate is stored in the terminal. Since the terminal in any of the cryptographic procedures in SET protocol would not necessarily have to read data from the credit card, the SET process really authenticates the terminal that is participating in the transaction, and only incidentally authenticates the card to which the transaction will be charged.

Thus, the SET protocols have a potential flaw: if the terminal is stolen, or if its software is copied, or if the terminal is somehow commandeered, fraudulent transactions will appear to be perfectly valid and, therefore, will be undetected.

When the authenticating certificate was granted, the terminal did pass the test of being in the possession of a legitimate cardholder. The problem with relying on the SET protocol alone is that no ongoing check is made of whether the legitimacy of the terminal has been compromised afterwards.

Accordingly, it is desirable to have a method and a system for correcting this deficiency.

SUMMARY OF THE INVENTION

The present invention is a method and a system for authenticating an electronic financial transaction conducted between a user owning a terminal and a third party via two-way transmissions between the terminal and a cable distribution hub which includes a validation server. The method comprises the following: (a) extracting a first identification attribute of the terminal from a first transmission message sent from the terminal to the cable distribution hub, which corresponds to a first set of user identifiers residing in a database accessible by the validation server; (b) extracting a second identification attribute of the terminal from a second transmission message sent from the terminal to the cable distribution hub, which corresponds to a second set of user identifiers residing in the database accessible by the validation server; (c) comparing the first and second sets of user identifiers to validate the identity of the user; (d) interrupting the electronic financial transaction if there is a discrepancy between the two sets of user identifiers; and (e) allowing the electronic financial transaction to proceed if there is no discrepancy between the two sets of user identifiers.

DESCRIPTION OF THE PRESENT INVENTION

In the following description, for purposes of explanation, numerous details are set forth in order to provide a thorough understanding of the present invention. However, it will be apparent to one skilled in the art that these specific details are not required in order to practice the present invention.

The present invention is a method and a system for authenticating an electronic financial transaction conducted between a user owning a terminal and a third party via two-way transmissions between the terminal and a cable distribution hub. The first embodiment of the present invention is implemented in a communications system which uses a cable connection for both upstream and downstream transmissions. The second embodiment of the present invention is implemented in a communications system which uses a cable connection for downstream transmissions from a cable distribution hub to a user terminal and a telephone connection for upstream transmissions from the user terminal to the cable distribution hub.

Figure 1:
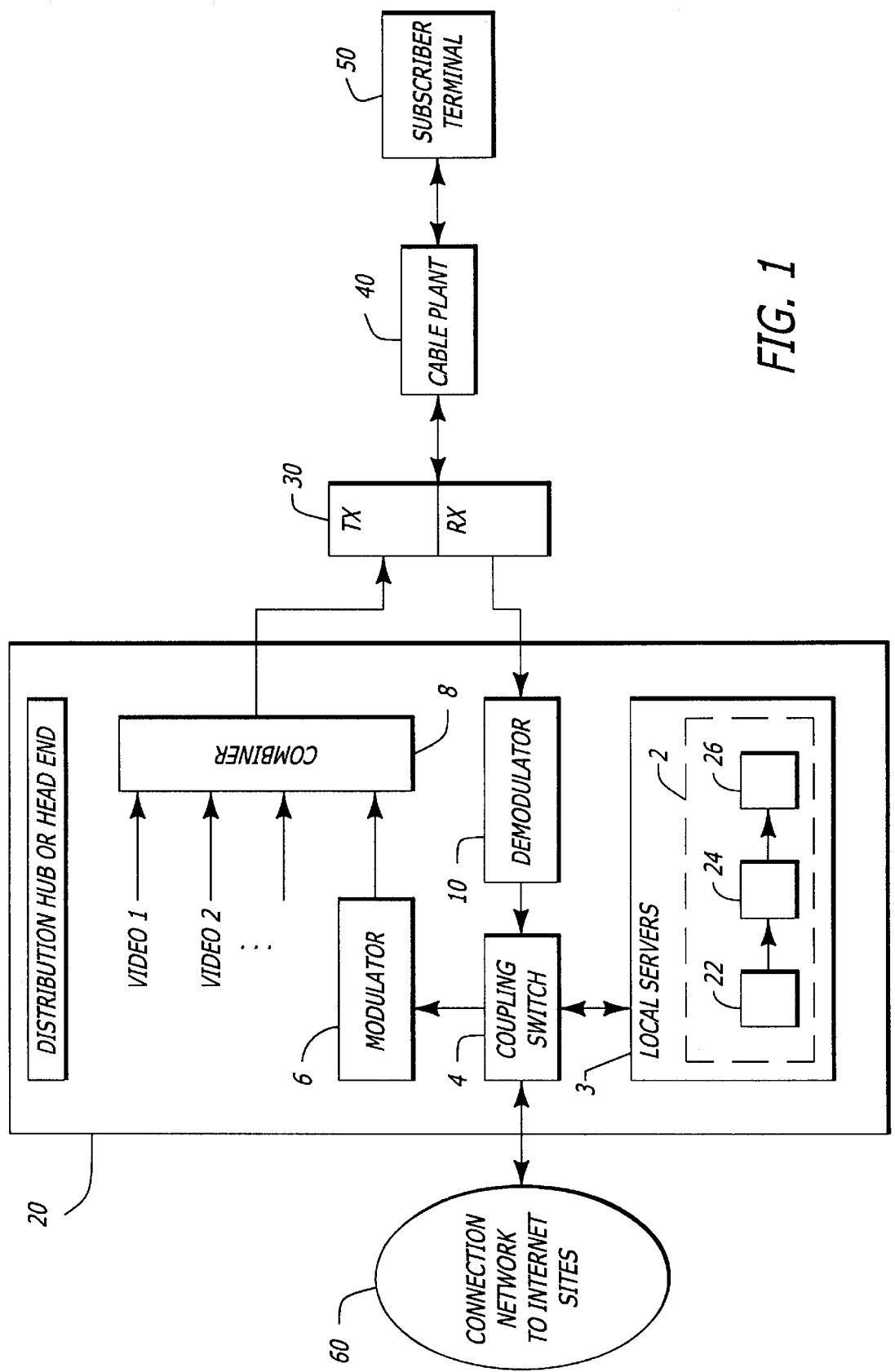
FIG. 1 is a block diagram illustrating the first embodiment of the system of the present invention, in which the two-way communications between the cable distribution hub and the user terminal are effected via cable connection.

FIG. 1 is a block diagram of the first embodiment of the communications system of the present invention. In FIG. 1, the cable distribution hub 20, also called a cable head end, communicates with the user terminal 50 through a diplexer 30 and a cable plant 40.

The cable distribution hub 20 comprises local servers 3, including a validation server 2, a coupling switch 4, a modulator 6, a combiner 8 and a demodulator 10. The coupling switch 4 allows the cable distribution hub 20 to communicate with the Internet connection network 60. This connection adds the Internet connectivity to the services offered to the user by a cable system which includes the cable distribution hub. A third party, such as a merchant, with whom the terminal 50 user wants to conduct an electronic financial transaction, can be a site in the connection network 60.

Referring to FIG. 1, in a downstream cable transmission, a message originated from a local server 2 or from an Internet site 60 passes through the coupling switch 4, is modulated by the modulator 6 and combined with other video data, if any, by the combiner 8, then transmitted by the diplexer 30 as a radio frequency (RF) signal to the cable plant 40 which subsequently sends it to the user terminal 50.

Referring to FIG. 1, in an upstream cable transmission, a message is sent from the user terminal 50 to the cable plant 40 which in turn sends it as a modulated RF signal to the diplexer 30. The upstream message is then demodulated by the demodulator 10 and sent to the coupling switch 4. The upstream message is then routed to a system of local servers 3, and/or an Internet site in the network 60, if that Internet site is the intended recipient of the message.

The system of local servers 3 includes a validation server 2. The validation server 2 comprises a parsing module 22, a comparator module 24, and a decision module 26.

Downstream transmission (from cable distribution hub 20 to user terminal 50) is in the form of a data stream dedicated to this purpose. This data stream may be incorporated into a multiplex signal containing other video, audio, or data streams. The multiplexed signal occupies a bandwidth of 6 MHz, and the transport layer is as specified by MPEG Standard for the generation and transmission of digital video. Alternately, an entire 6 MHz bandwidth may be dedicated to the transmission of this data stream, or this data stream may be distributed in several 6 MHz bandwidth segments transmitted down the cable.

Upstream transmission via cable is presently in the 5–40 MHz bandwidth used for a radio frequency (RF) return path. The same protocol governs both the upstream and downstream transmissions. various data rates are available and the carrier frequencies can be flexibly set.

Both downstream and upstream messages are as specified in the Cable Labs specification. They typically contain a Destination Address and a Source Address, at the MAC (Media Access Control) sublayer. These 48-bit addresses identify the ultimate source and destination of the data. Since the Cable Labs specification was written for cable modems which may operate in a stand alone mode, these addresses could refer to either the address of the cable modem or the address of the customer premise equipment to which the cable modem may be connected, for example, an Ethernet card in a Personal Computer (PC) which facilitates connection to a Local Area Network. When a cable modem is part of a terminal, it is convenient to have the cable modem and the customer premise equipment to have the same MAC address, since they refer to the same physical terminal. For ease of description of the present invention, hereinafter, the cable modem address, i.e., the MAC address, and the customer premise equipment address, e.g., Ethernet card address, are assumed to be the same, although making these two addresses the same is not necessary for practicing this invention.

The MAC address is part of the hardware of the cable modem and is intrinsic to it. In the present invention, additional information is derived from the MAC address. The cable distribution hub 20 maintains a database which stores the MAC address of the terminal 50 and other identifiers of the terminal 50 such as the user's name, telephone number, and location, etc. . . . Once the MAC address of terminal 50 is acquired, the validation server 2 can find these identifiers, using the MAC address as an entry for lookup. The database is kept up to date by the validation server 2. The identity of the terminal 50 is relevant to validating a financial transaction initiated by the terminal 50, because it can be tied to the payment record of the user serviced by the terminal 50. The terminal's identity also establishes that the terminal 50 is in the database of terminals which are currently regarded by the cable operator as valid and operational.

The cable transmissions can be sent in one of three different modes: secure mode, private mode, and clear mode. In the secure mode, the entire content of each message, including the source and destination addresses, is encrypted. In the private mode, the source and destination addresses in each message are unencrypted, but the rest of the message is encrypted. In the clear mode, the entire content of each message, including the source and destination addresses, is not encrypted. Since upstream messages would be decrypted at the head end for further processing, these addresses would be available at the head end in all three modes of transmission.

Each of the upstream messages sent from a cable modem has elements which are indicative of the identity of their source. These elements are the MAC address of the cable modem and the certificate containing the modem's public key. This public key is uniquely related to the private key which was used to encrypt the content of messages required by the SET protocol.

Figure 3:
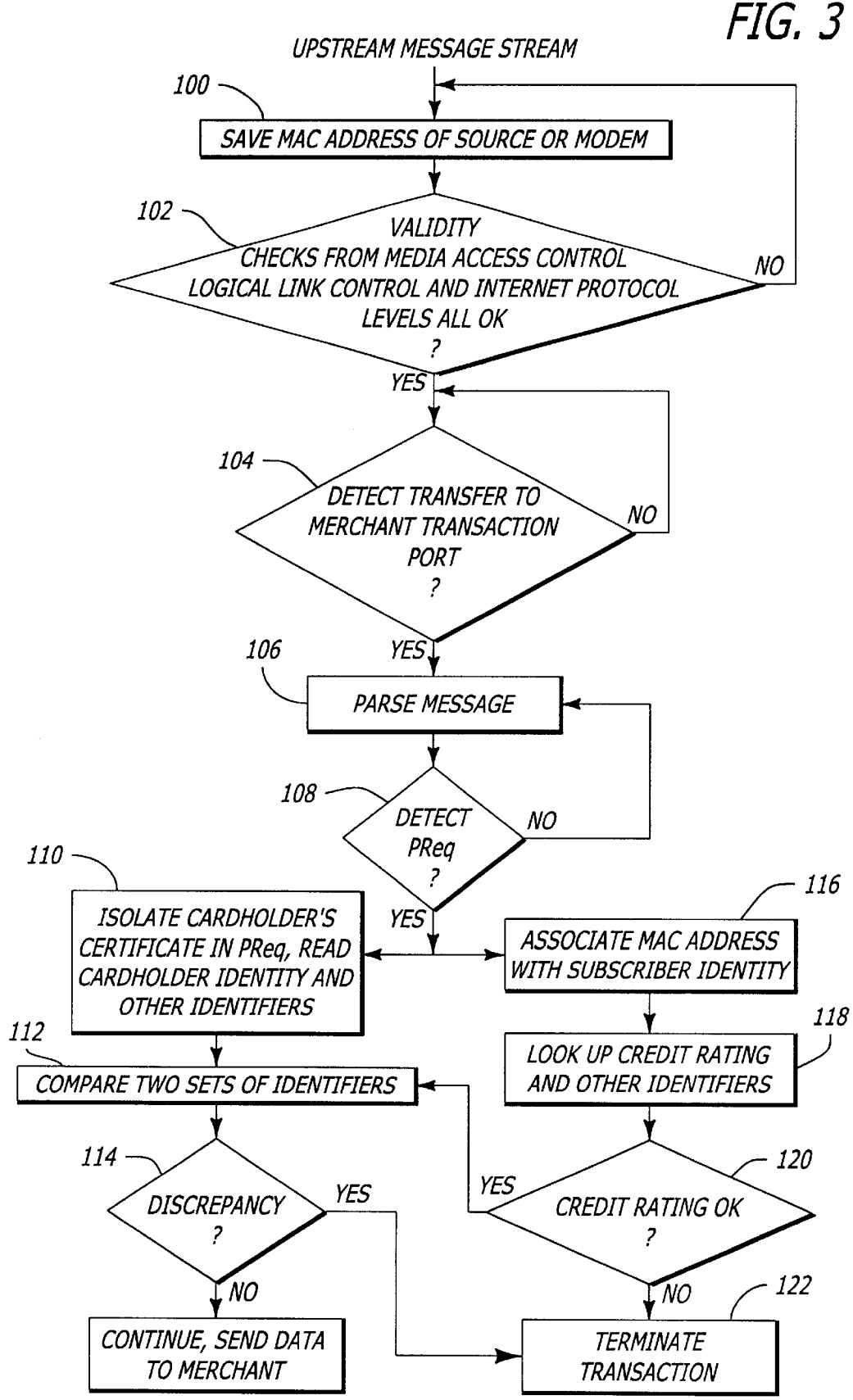
FIG. 3 is a flow chart illustrating the first embodiment of the disclosed method as implemented in the first embodiment of the disclosed system.

FIG. 3 illustrates the first embodiment of the method of the present invention. The following description refers to FIGS. 1 and 3.

When an upstream message sent by the user terminal 50 via cable is received by the validation server 2, the parsing module 22 extracts and saves either the source address or the MAC address, hereinafter assumed to be the same, of the terminal 50 (block 100 of FIG. 3) from the MAC sublayer form of the upstream message. This data will be used later to check the current credit worthiness of the user who owns terminal 50, when a financial transaction is initiated by terminal 50 user.

After the MAC address of a protocol data unit that is the start of a new message is sensed, the header and text body of the protocol data unit is checked (block 102) for errors at the MAC and logical link control (LLC) levels before the address is accepted and stored. Thereafter, new blocks of data are accepted only if their validity continues to check positively at the MAC, LLC and IP levels. If the new data unit is judged to be invalid in block 102, the process is terminated and restarted when a MAC address corresponding to a protocol data unit of a new message is sensed.

When the user initiates a financial transaction, the validation server 2 must intercept the cardholder certificate which identifies the user and binds him to his public key included in the upstream messages. This certificate is sent in the clear for use in validating a cardholders digital signature. The validation server 2 locates the certificate in the PReq message.

In order to detect the PReq message, the parsing module 22 of the validation server 2 must examine the content of the IP messages that may be part of the Secure Electronic protocol. The preferred way of doing this is as follows. After the Merchant and the terminal user agree upon a purchase, the user requests to transfer the messages that initiate the SET protocol to a new destination address (URL) which the validation server 2 recognizes as being the Merchant's port for financial transactions. One way of implementing this transfer to a new web site is to require that the user click on a link to effect this transfer request. When the parsing module 22 of the validation server 2 detects this new URL address (block 104), it begins decoding the IP messages (block 106) destined for that port to look for the PReq message (block 108), which is the first (if PInitReq is not sent) or the second meaningful message transmitted from the user's terminal 50. If the PInitReq message is sent, the server 2 will pass this message on to the Merchant's port without any change. The parsing module 22 preferably stores the PReq message and all succeeding messages in a buffer until the decision module 26 of the validation server 2 determines whether to allow the financial transaction to proceed or to terminate the transaction.

As described above in the Background of the Invention section, the PReq message contains encrypted cardholder data and a digital signature which is outside of the encrypted data envelope, and a cryptographic construct which links the ordering information with the payment information. The digital signature format requires inclusion of the certificate that validates the signature. In the present invention, all the PReq messages have the digital signature format. Currently, each cardholder certificate has a name field to contain the name of the holder of the private key. To conform to the SET protocol which requires that the identity of the cardholder be kept secret, in the present invention, the name field of the cardholder certificate contains a value that has meaning only to the cable distribution hub, such as the terminal MAC address.

If the upstream message is a PReq message, indicating that the user wants to conduct a financial transaction, then the parsing module 22 extracts the cardholder certificate included in the PReq message and the cardholder data included in the cardholder certificate (block 110). The cardholder data forms a second set of user identifiers. A first set of user identifiers is obtained by associating the MAC address with the user identity (block 116) and by using the MAC address to look up the current attributes of the cable user owning the terminal 50 (block 118) in the database of the validation server 2. If the data in this first set of user identifiers show that the user credit history does not warrant extending credit to the user (block 120), then the decision module 26 terminates the financial transaction (block 122). Otherwise, the comparator module 24 compares the data in the first and second set of user identifiers (block 112) to determine if there is any discrepancy between the two sets (block 114). If there is any discrepancy, the decision module 26 terminates the financial transaction (block 122). If there is no discrepancy, the decision module 26 concludes that the person initiating the transaction is in fact the cardholder, and the decision module 26 allows the financial transaction to proceed. The validation server 2 then transfers the PReq message and all succeeding messages that were stored in a buffer while the validation server 2 was validating the credit worthiness of the user to the Merchant's port, and stops looking at the content of messages directed to the Merchant's transaction port.

The method of the present invention would detect terminals that were reported to have been stolen, since the current attributes of the cable user owning a terminal would be looked up using the MAC address of the terminal. The method could also detect whether a terminal or a certificate is being used without authorization.

Not shown in FIG. 3 are various error handlers, which take the system out of its anticipated progression through the flow chart if something unexpected happens. For example, if PReq is not detected within a preset time interval, some corrective action must be taken.

Figure 4:
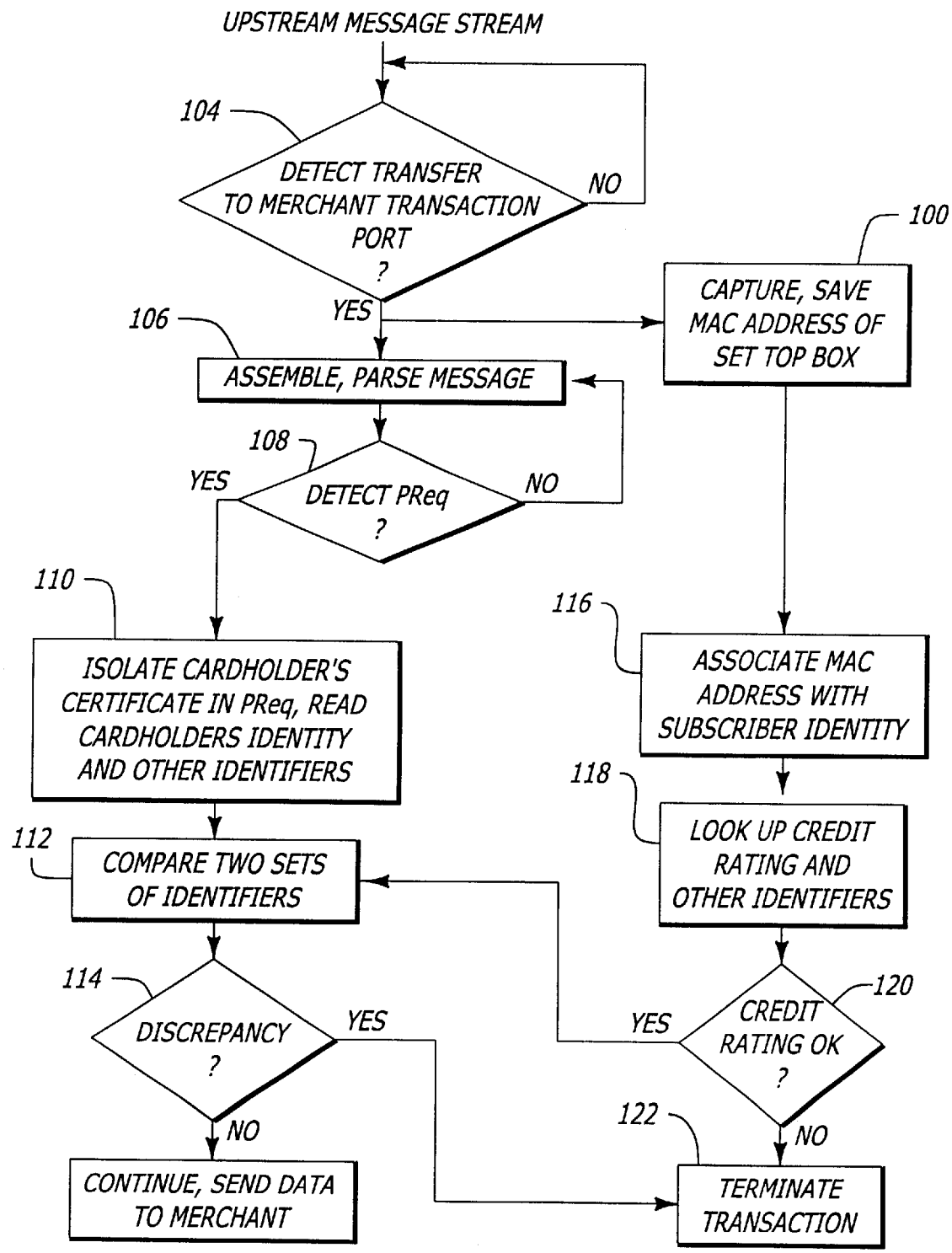
FIG. 4 is a flow chart illustrating the preferred embodiment of the disclosed method as implemented in the first embodiment of the disclosed system.

In the embodiment of the method shown in FIG. 3, the MAC address of every terminal that is on line must be stored in order to check any financial transaction that may develop later. FIG. 4 shows an alternate, preferred implementation of the invention which is more efficient in memory management. In this preferred embodiment of the method of the invention, all protocol data units (PDUs) at the MAC sublayer level are passed through a short buffer which can store one MAC level PDU. When a transfer to the "financial transaction URL" is detected (block 104) at the IP level, a packet which is part of that message is taken from the buffer and its MAC address is stored (block 100). This MAC address is entered in the set top unit database residing in the validation server 2, and the user credit history and identifiers associated with that MAC address is looked up (block 118).

As shown in FIG. 4, this first set of data is used to further corroborate the authenticity of the cardholder certificate. In FIG. 4, block numbers that are identical to block numbers in FIG. 3 correspond to the same functions.

Figure 2:
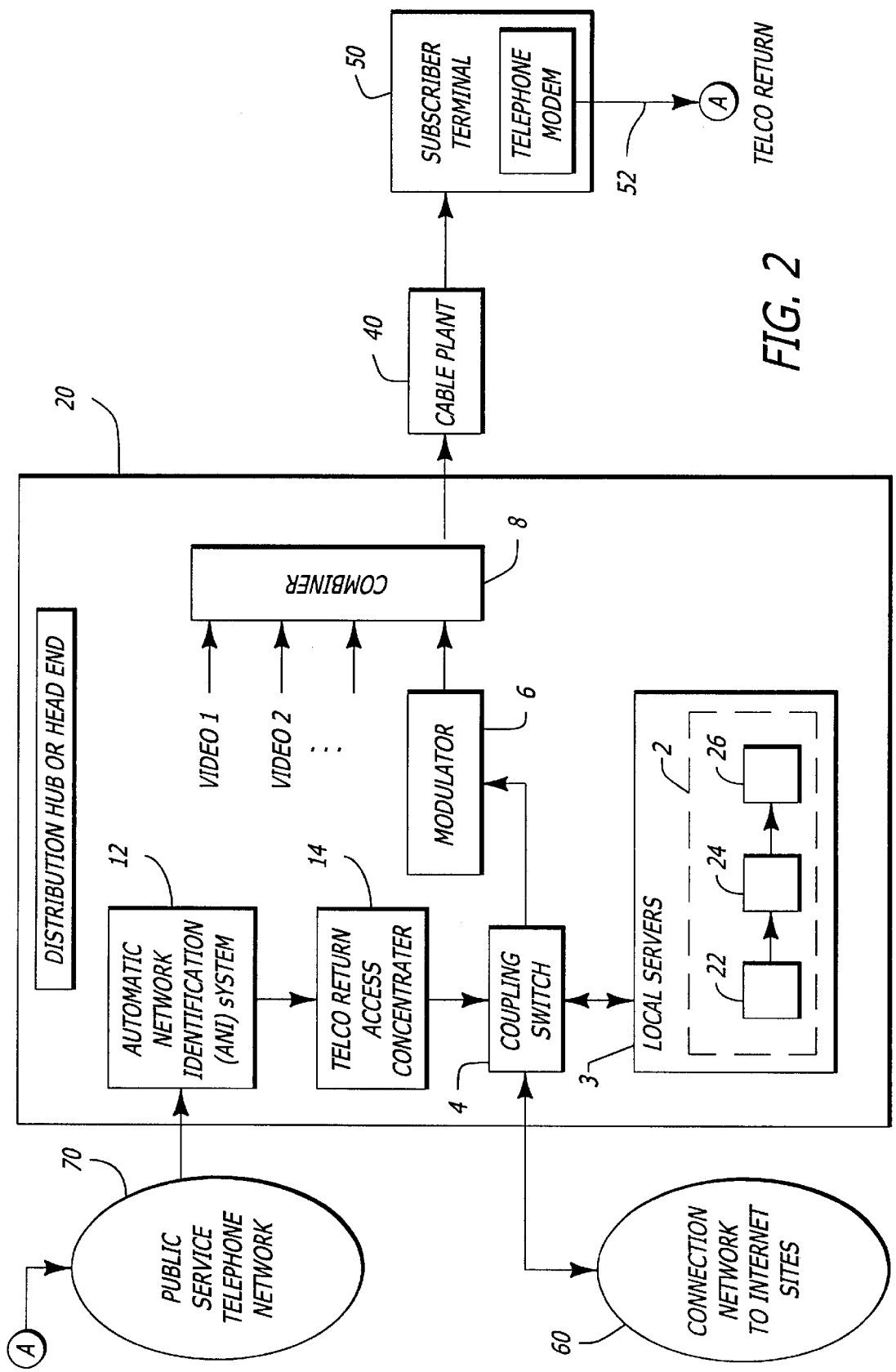
FIG. 2 is a block diagram illustrating the second embodiment of the system of the present invention, in which the two-way communications between the cable distribution hub and the user terminal are effected via cable in conjunction with a telephone connection.

FIG. 2 is a block diagram of the second embodiment of the communications system of the present invention. In FIG. 2, the cable distribution hub 20 communicates with the user terminal 50 via downstream cable transmissions and upstream telephone transmissions.

Referring to FIG. 2, in a downstream cable transmission, a message originated from one of the local servers 3 or from an Internet site 60 passes through the coupling switch 4, is modulated by the modulator 6 and combined with other video data, if any, by the combiner 8, then transmitted as a radio frequency (RF) signal to the cable plant 40 which subsequently sends it to the user terminal 50.

Referring to FIG. 2, in an upstream telephone transmission, a message is sent from the telephone modem of the user terminal 50 as a telephone return signal 52 to the public service telephone network 70 which relays it to the automatic network identification (ANI) system 12. The ANI system 12 captures the calling telephone number and then sends the upstream message to the telephone return access concentrator 14 which then routes it to the coupling switch 4 to be received by one of the local servers 3 and a third party's Internet site 60, which is the intended recipient of the message. The third party is typically a Merchant.

The protocol for an upstream telephone transmission is the same as the one currently used for connecting to the Internet by a telephone connection, which is the Point to Point Protocol (PPP). This protocol ensures proper user login. Each user terminal is required to furnish its login identification and a password which are checked before access is permitted. At the time of initial set-up of the terminal 50 cable modem which will send upstream transmissions by telephone, the cable distribution hub 20 supplies these two login parameters and the telephone number to be called in a downstream message to the cable. The login parameters and the corresponding MAC address are stored in a database accessible by the cable distribution hub. Thus, although the MAC address of the cable modem is not included in an upstream transmission by telephone, the MAC address can be looked up in the database from the corresponding login parameters.

Currently, telephone networks allow, under certain circumstances, a called station to capture the telephone number of a calling party. This feature is called automatic network identification (ANI). FIG. 2 illustrates a second embodiment of the present invention which uses an ANI system 12.

Figure 5A:
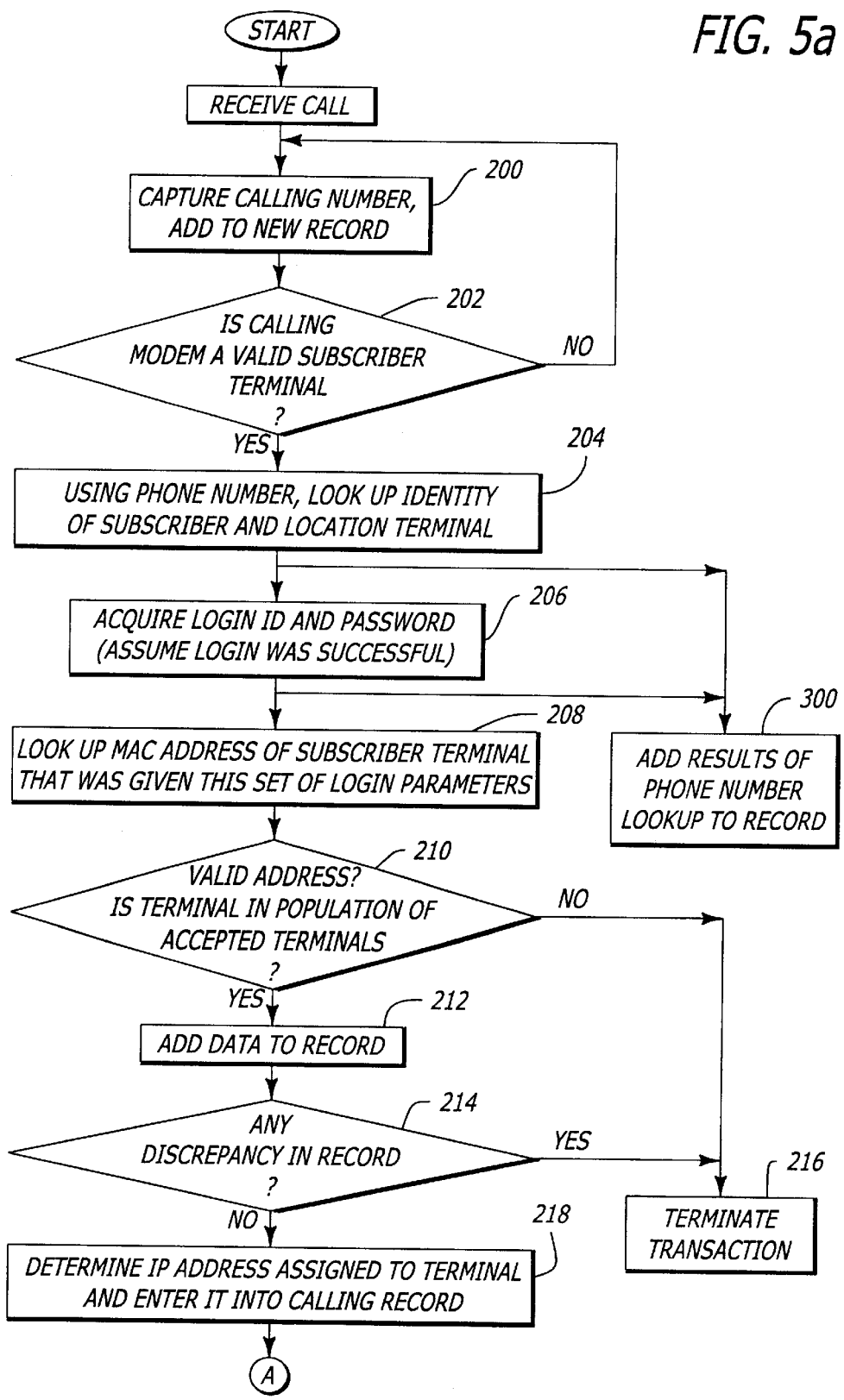
FIGS. 5a and 5b show a flow chart illustrating the second embodiment of the disclosed method as implemented in the second embodiment of the disclosed system.
Figure 5B:
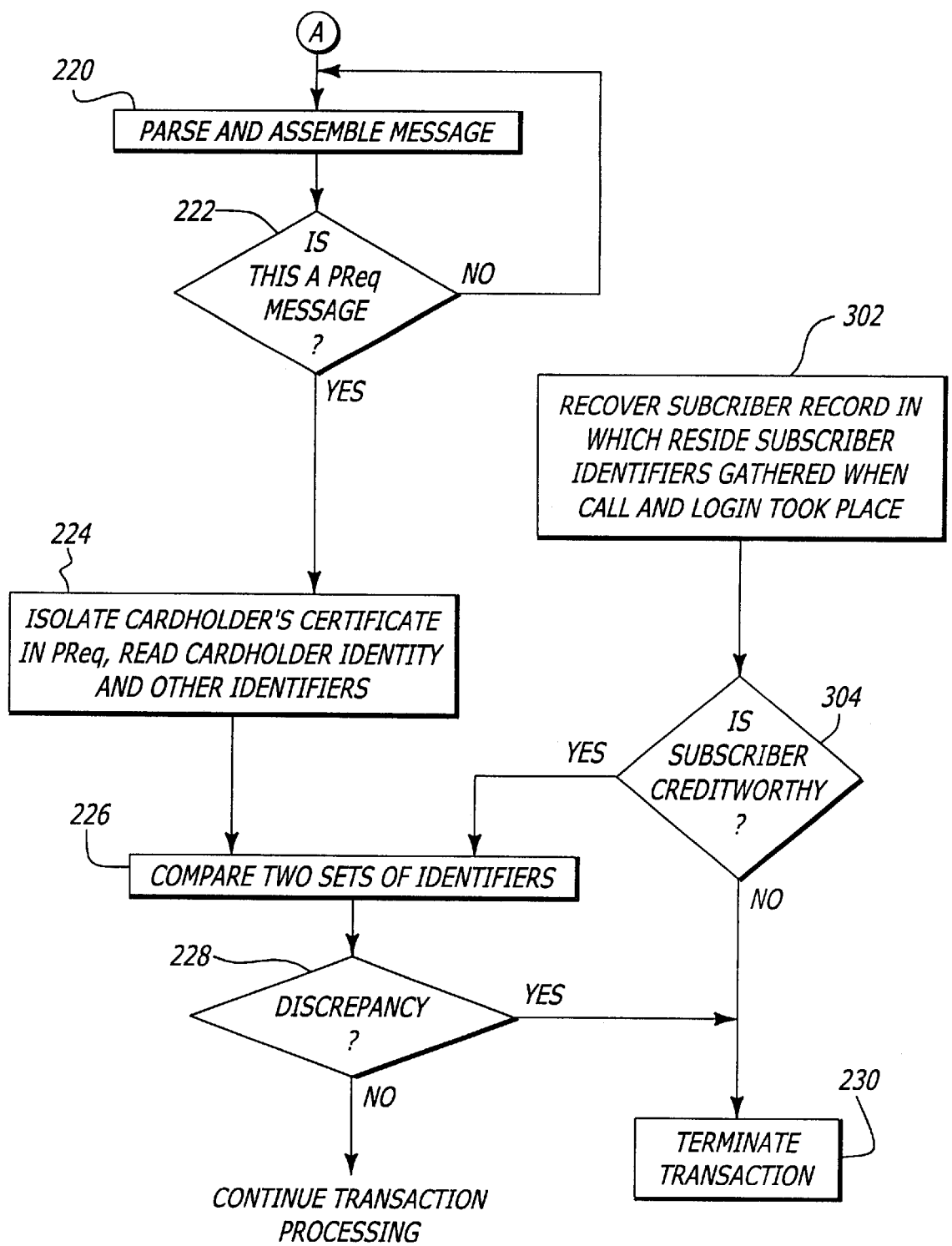

FIGS. 5a and 5b illustrate the second embodiment of the method of the present invention. The following description refers to FIGS. 2, 5a and 5b. When a telephone call is received at the cable distribution hub 20 from the user terminal 50 via the telephone network 70, the ANI system 12 captures the calling number and subsequently passes it along to the validation server 2 which adds it to a new calling record located in the validation server 2 (block 200 of FIG. 5a). If the calling terminal 50 is not a valid user terminal, the calling terminal 50 will be denied access to the cable network. If the calling terminal 50 is a valid user terminal, then the captured phone number is used to look up, in a database of the validation server 2, the identity of the user and the location of the terminal 50 (block 204). These data are then added to the calling record (block 300). The server 2 now knows the location of the terminal. The login parameters furnished by the user terminal 50 in order to obtain successful login, i.e., login identification and password, are extracted from an upstream message (block 206), by the parsing module 22. This set of login parameters is then used by the validation server 2 to look up in a database the corresponding MAC address of the terminal 50 (block 208). The server 2 now knows the MAC address of the terminal. If this MAC address is not a valid address, i.e., if it indicates that the user terminal is not in the population of terminals served by the validation server 2 (block 210), then the validation server 2 terminates the transaction initiated by the user terminal 50 (block 216). Otherwise, the validation process proceeds to block 212, where the MAC address is added to the calling record. The comparator module 24 compares the identifiers derived from the phone number with the identifiers derived from the login ID/password data and the MAC address. If there is any discrepancy in these data of the calling record (block 214), the decision module 26 terminates the transaction (block 216). Otherwise, the validation server 2 determines the Internet Protocol (IP) address assigned to the calling terminal 50 and enters it in the calling record (block 218). As part of the login procedure, the user terminal 50 is assigned an IP address each time it calls. The calling record is preferably deleted from the validation server's memory when the telephone connection is broken.

The validation server 2 continues normal processing of upstream messages from the terminal 50, i.e., the server 2 relays the upstream messages to the intended recipient which is a third party in the Internet network 60 (block 220 of FIG. 5b) until the server 2 is signaled by the user that he is initiating a financial transaction. The user does this signaling by requesting, e.g., through a double click on a hyperlink, a transfer to a distinctive destination address (URL) which the validation server 2 recognizes as being the Merchant's port for financial transactions. This signaling is used in order to not tie up the server 2 which is processing telephone messages from several cable users. When the server 2 detects this transfer request from the user, the parsing module 22 of the validation server 2 begins decoding the IP messages destined for the Merchant's port to look for the Preq message, which may be the first (if the PInitReq is not sent) or the second meaningful message transmitted from the user terminal 50. If the PInitReq message is sent, the server 2 will pass this message on to the Merchant's port without any change. The parsing module 22 preferably stores the Preq message and all succeeding messages in a buffer until the decision module 26 determines whether to allow the financial transaction to proceed or to terminate the transaction.

If the upstream message is a PReq message, indicating that the user wants to initiate a financial transaction, then parsing module 22 of the validation server 2 extracts the cardholder certificate included in the message, and the cardholder data included in the cardholder certificate (block 224). The cardholder data forms a second set of user identifiers. A first set of user identifiers is already obtained and entered in the database (block 212 of FIG. 5a). This first set of identifiers is retrieved from the database and examined by the comparator module 24 of server 2 (block 302). If the data in this first set of user identifiers show that the user credit history does not warrant extending credit to the user (block 304), then the decision module 26 terminates the financial transaction (block 230). Otherwise, the comparator module 24 of server 2 compares the data in the first and second set of user identifiers (block 226) to determine if there is any discrepancy between the two sets (block 228). If there is any discrepancy, the decision module 26 of server 2 terminates the financial transaction (block 230). If there is no discrepancy, the decision module 26 concludes that the person initiating the transaction is in fact the cardholder, and allows the financial transaction to proceed. The validation server 2 then transfers the PReq message and all succeeding messages that were stored in a buffer while the server 2 was validating the credit worthiness of the user to the Merchant's port, and stops looking at the content of messages directed to the Merchant's transaction port.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for authenticating an electronic financial transaction conducted between a user operating a terminal and a third party via two-way transmissions between the terminal and a cable distribution hub of a cable data network, the cable distribution hub including a validation server, the method comprising:
   (a) extracting a first identification attribute from a first transmission message sent from the terminal to the cable distribution hub and looking up a first user identifier in a first set of user identifiers residing in a database accessible by the validation server in response to the first identification attribute;
   (b) extracting a second identification attribute from a second transmission message sent from the terminal to the cable distribution hub and looking up a second user identifier in a second set of user identifiers residing in the database accessible by the validation server in response to the second identification attribute;
   (c) comparing the first user identifier and the second user identifier together against each other to validate an identity of the user;
   (d) interrupting the electronic financial transaction when there is a discrepancy in the comparison indicating that the first user identifier and the second user identifier are different; and
   (e) allowing the electronic financial transaction to proceed when there is no discrepancy in the comparison indicating that the first user identifier and the second user identifier are the same.

2. The method as recited in claim 1 wherein the two-way transmissions include
   upstream transmissions sent from the terminal to the cable distribution hub via a cable connection and
   downstream transmissions sent from the cable distribution hub to the terminal via the cable connection.

3. The method as recited in claim 2 wherein the first identification attribute is a terminal identifier and includes
   a media access control (MAC) address assigned by the cable distribution hub to the terminal, the MAC address being intrinsic to the hardware of the terminal.

4. The method as recited in claim 2 wherein the second identification attribute is a user authentication and includes
   an electronic certificate granted to the user by a certifying authority, said electronic certificate residing in the software of the terminal.

5. The method as recited in claim 2 wherein the first identification attribute is a terminal identifier and includes
   an Ethernet card address, the Ethernet card address being intrinsic to the hardware of the terminal.

6. The method as recited in claim 1 wherein the two-way transmissions include
   upstream transmissions sent from the terminal to the cable distribution hub via a telephone connection and
   downstream transmissions sent from the cable distribution hub to the terminal via a cable connection.

7. The method as recited in claim 6 wherein the first identification attribute is a terminal identifier and includes a telephone number of the terminal and
   the second identification attribute is a terminal identifier and includes a media access control (MAC) address assigned by the cable distribution hub to the terminal, said SAC address being intrinsic to the hardware of the terminal.

8. The method as recited in claim 7 wherein the first and second set of user identifiers comprises
   identity of users and locations of terminals.

9. The method as recited in claim 7 wherein the first and second set of user identifiers comprises
   identity of users and credit ratings of users.

10. The method as recited in claim 1 wherein the operation of interrupting the electronic financial transaction includes
    terminating the electronic financial transaction.

11. The method as recited in claim 1 wherein the first and second set of user identifiers comprises
    identity of users and credit ratings of respective users.

12. The method as recited in claim 1 wherein the first and second set of user identifiers comprises
    identity of users.

13. The method as recited in claim 1 further comprising:
    examining a user credit rating; and
    terminating the financial transaction if the user credit rating is unsatisfactory.

14. The method as recited in claim 1 wherein,
    the user is a cable subscriber.

15. The method as recited in claim 1 wherein,
    the electronic financial transaction is an order and payment for products or services.

16. A system for authenticating an electronic financial transaction conducted between a user and a third party, the system comprising:
    (a) a terminal operated by the user, the user initiating the electronic financial transaction via the terminal; and
    (b) a cable distribution hub of a cable data network in communication with the terminal and the third party, the cable distribution hub including a validation server, the validation server including
       a parsing module to extract first and second identification attributes of the terminal respectively from first and second transmission messages sent from the terminal to the cable distribution hub and to look up a first user identifier and a second user identifier respectively in first and second sets of user identifiers residing in a database accessible by the validation server in response to the first and second identification attributes of the terminal;
       a comparator module coupled to the parsing module, the comparator module to compare the first user identifier with the second user identifier to validate identity of the user; and
       a decision module coupled to the comparator module, the decision module to
          interrupt the electronic financial transaction if there is a discrepancy detected by the comparator module between the first user identifier and the second user identifier; and
          allow the electronic financial transaction to proceed between the terminal and the third party if there is no discrepancy detected by the comparison module between the first user identifier and the second user identifier.

17. The system as recited in claim 16 wherein communication between the cable distribution hub and the terminal includes upstream transmissions sent from the terminal to the cable distribution hub via a cable connection and downstream transmissions sent from the cable distribution hub to the terminal via the cable connection.

18. The system as recited in claim 17 wherein the first identification attribute comprises a media access control (MAC) address assigned by the cable distribution hub to the terminal, the MAC address being intrinsic to the hardware of the terminal.

19. The system as recited in claim 17 wherein the second identification attribute comprises an electronic certificate granted to the user by a certifying authority.

20. The system as recited in claim 17 wherein the first identification attribute comprises an Ethernet card address, the Ethernet card address being intrinsic to the hardware of the terminal.

21. The system as recited in claim 16 wherein the communication between the cable distribution hub and the terminal includes upstream transmissions sent from the terminal to the cable distribution hub via a telephone connection and downstream transmissions sent from the cable distribution hub to the terminal via a cable connection.

22. The system as recited in claim 21 wherein the first identification attribute comprises a telephone number of the terminal and the second identification attribute comprises a media access control (MAC) address assigned by the cable distribution hub to the terminal, said MAC address being intrinsic to the hardware of the terminal.

23. The system as recited in claim 16 wherein the third party has a World Wide Web site address.

24. The system as recited in claim 16 wherein communication between the cable distribution hub and the third party is via a communication network.

25. The system as recited in claim 24 wherein the communication network is an internet.

26. The system as recited in claim 16 wherein, the user is a cable subscriber.

27. The system as recited in claim 16 wherein, the electronic financial transaction is an order and payment for products or services.

28. A method for authenticating an electronic financial transaction conducted between a user operating a terminal and a third party via two-way transmissions between the terminal and a cable distribution hub of a cable data network, the cable distribution hub including a validation server, the two-way transmissions using a multi-layer communication protocol, the method comprising:

(a) extracting a first identification attribute of the terminal at a first level of the multi-layer communication protocol from a transmission message sent from the terminal to the cable distribution hub and looking up a first identity in a data base of user identifiers using the first identification attribute;

(b) extracting a second identification attribute of the terminal at a second level of the multi-layer communication protocol from the transmission message sent from the terminal to the cable distribution hub, the second identification attribute differing from the first, and looking up a second identity in the data base of user identifiers using the second identification attribute;

(c) comparing the first identity with the second identity to validate the user for the electronic financial transaction;

(d) interrupting the electronic financial transaction when there is a discrepancy between the comparison of the first identity with the second identity; and (e) allowing the electronic financial transaction to proceed when there is no discrepancy between the comparison of the first identity with the second identity.

29. The method as recited in claim 28 wherein the first level of the multi-layer communication protocol is the media access control (MAC) level in the transmission message and the second level of the multi-layer communication protocol is the TCP/IP level in the transmission message.

30. The method as recited in claim 29 wherein the first identification attribute includes a media access control (MAC) address assigned by the cable distribution hub to the terminal, the MAC address being intrinsic to the hardware of the terminal.

31. The method as recited in claim 29 wherein the second identification attribute includes an electronic certificate granted to the user by a certifying authority, said electronic certificate residing in the software of the terminal.

32. The method as recited in claim 29 wherein the first identification attribute includes an Ethernet card address, the Ethernet card address being intrinsic to the hardware of the terminal.

33. The method as recited in claim 29 wherein the first set of identifiers includes the identity and credit rating of the user.

34. The method as recited in claim 29 wherein the second set of identifiers includes the identity of the user.

35. The method as recited in claim 28 wherein the two-way transmissions include upstream transmissions sent from the terminal to the cable distribution hub via a telephone connection and downstream transmissions sent from the cable distribution hub to the terminal via a cable connection.

36. The method as recited in claim 35 wherein the first identification attribute includes a telephone number of the terminal and the second identification attribute includes a media access control (MAC) address assigned by the cable distribution hub to the terminal, said MAC address being intrinsic to the hardware of the terminal.

37. The method as recited in claim 36 wherein the first set of identifiers includes the identity of the user and the location of the terminal.

38. The method as recited in claim 36 wherein the second set of identifiers includes the identity and credit rating of the user.

39. The method as recited in claim 28 wherein the operation of interrupting the electronic financial transaction includes terminating the electronic financial transaction.

40. The method as recited in claim 28 further comprising:

examining a user credit rating in the first set of user identifiers; and terminating the financial transaction if the user credit rating is unsatisfactory.

* * * * *